F. W. MIX.
Mode of Ornamenting Metallic Articles.

No. 197,787. Patented Dec. 4, 1877.

Witnesses
Theo. E. Smith
M. S. Wiard

Inventor
Frank W. Mix

UNITED STATES PATENT OFFICE.

FRANK W. MIX, OF TERRYVILLE, CONNECTICUT.

IMPROVEMENT IN THE MODE OF ORNAMENTING METALLIC ARTICLES.

Specification forming part of Letters Patent No. 197,787, dated December 4, 1877; application filed April 22, 1876.

*To all whom it may concern:*

Be it known that I, FRANK W. MIX, of Terryville, in the county of Litchfield and State of Connecticut, have invented a new Method of Producing Ornamental Effects upon Metallic Surfaces, or a new Method of Ornamenting Metallic Surfaces; and that the following, taken in connection with the drawings, is a full, clear, and exact description thereof.

Figure 1:
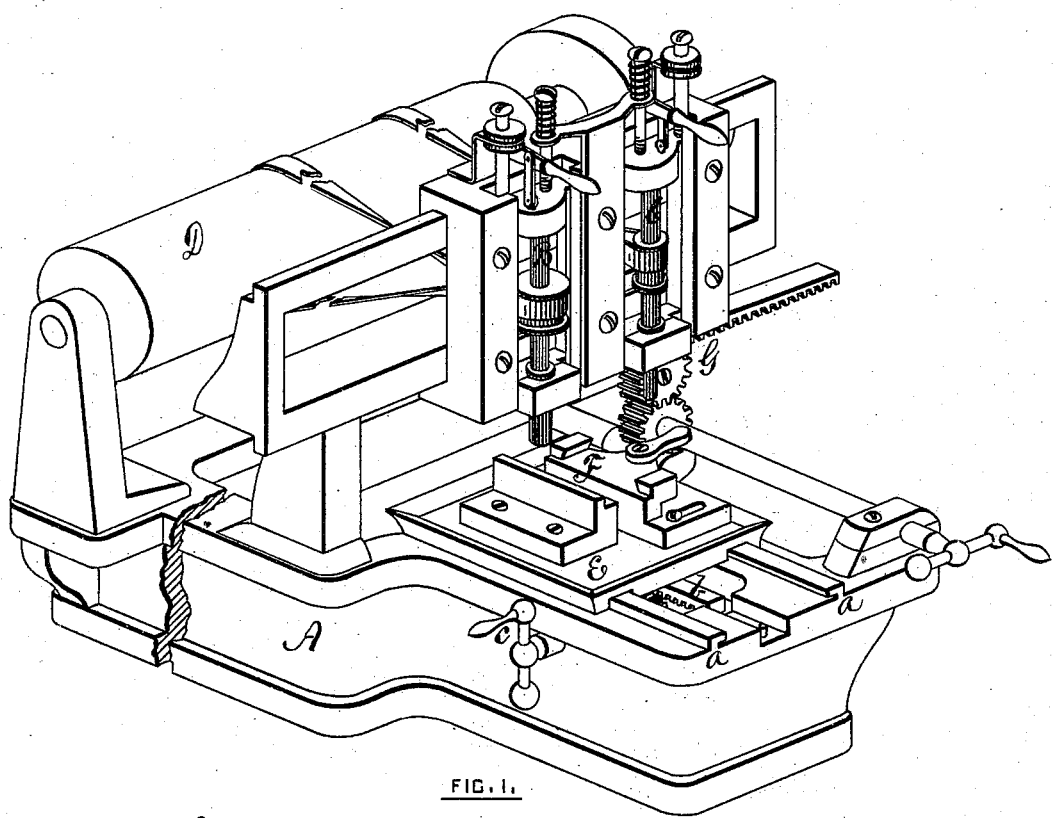
Figure 2:
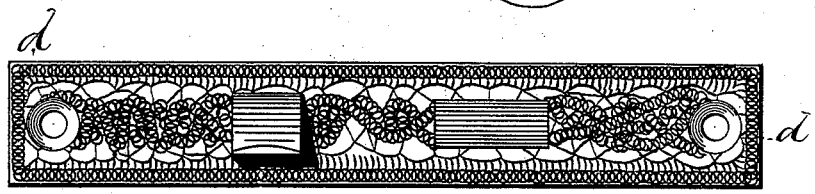
Figure 3:
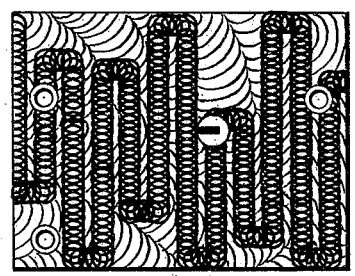

In the drawings, Figure 1 is a perspective view of a machine by means of which my process or method may be worked out. Fig. 2 is a plan of a mortise-lock front or face ornamented by my process; and Fig. 3 is a plan of a cabinet-lock face similarly ornamented, these drawings representing such ornamentation as nearly as the requirements of the Patent Office in regard to drawings will permit.

The ornamentation attained by my process produces an effect upon the eye, owing to the fact that the general plain surface is divided up into a great number of surfaces of small extent, which are curved or plain, and lie at different angles with each other; hence light, striking the whole surface, is reflected from surfaces of small extent at different angles with each other; also, some of the surfaces may be in shadow, or partially so, and some of them may be in such relation to the light and eye that they do not reflect.

In carrying out my process, the surface to be ornamented is first to be smoothed by planing, grinding, milling, or in any proper way; and I prefer to do this by means of a face-milling tool, or a tool provided with cutting-teeth on the end of the tool, so that they revolve and cut in a plane perpendicular to the axis of the tool. After the surface is smoothed I then act upon it to ornament it in the manner hereinafter described, using to work out my process a milling-machine with a facing-tool, such as before referred to, in which the tool can be moved relatively to the surface to be ornamented, or the surface can be moved relatively to the tool, or both the tool and the surface can be moved relatively to each other. The drawings show a machine having the latter peculiarity, and represent a machine which I have employed with success; but I wish it distinctly understood that in all cases there must be a bed or table upon which the work to be ornamented can be supported or clamped, or both supported and clamped, which bed is so supported that the surface of the article to be ornamented shall be always in the same relation to the milling tool or cutter, differences owing to the springing of the cutters or their shafts excepted; or, in other words, the machine must be so constructed that the surface to be ornamented always moves in the same plane, while the tool is so mounted that it cannot, while ornamenting, (springing, as above, excepted,) change the angle of its axial line with the surface to be ornamented.

In the machine shown in the drawings, the supporting-table is shown at E, and is mounted upon ways *a a*, so that it moves in a horizontal plane. The axis of the milling tool or cutter is perpendicular to the plane, and the milling-tool can be moved also in a horizontal plane. If it were desired to ornament a cylindrical surface, the table or platform should turn on a horizontal axis, instead of sliding on ways. One of the cranks shown in the drawing, when turned, causes the tool to move in a right line; the other, when turned, causes the platform to move in a right line perpendicular to that in which the tool moves. By turning both cranks, the tool and surface can be moved in any direction with relation to each other in the same plane.

Inasmuch as it is necessary that the surface of the article should be first rendered smooth, I have found it convenient to organize the machine with two revolving milling-tools, one of which is attached to the spindle B, and the other to the spindle C. The office of one of these mills is to dress off and smooth, by the well-known milling operation, the surface of the article which the other milling-tool is to ornament; but I wish it to be understood, however, that my process of ornamental surfacing does not necessarily involve as a part of it any particular means or method by which the surface of the metal is rendered fit to receive the ornamentation; and, in fact, I have in some descriptions of articles employed a single revolving milling-tool, first to surface the metal and then to ornament that surface.

Ordinarily, however, it is necessary and generally advisable to specially prepare the surface for ornamentation by smooth-facing it by some one of the well-known mechanical means employed in facing metals—as, for example, milling, planing, or grinding.

The milling-tool for producing the ornamental surfacing should be, ordinarily, considerably less in diameter than the width of the article to be operated upon, in order to produce all the varied effects resulting from fanciful combinations of lines which compose different designs.

If the machine shown in the drawing be employed, the article to be operated upon has its surface dressed off smooth by one of the milling-tools. It is then brought under the action of the other milling-tool, for the purpose of having ornamental effects produced upon it. This is effected by moving the table by means of the rack-and-pinion gears, provided for moving the table, or the milling-tools, or both.

Suppose, for example, the article to be the front plate of a mortise-lock. The lock-case which, in the course of manufacture, has had its front plate already attached thereto, but with the surface of the plate rough, as it came from the mold in which it was cast, is placed in a suitable holder on the table E, and secured therein by a proper clamp-fastening, so that the plane of the plate shall be parallel, as near as may be, with the plane of the table. The surface of the plate is next dressed off smoothly by the action of the milling-tool attached to the spindle B, used in the ordinary way. This having been done, the table is moved by means of the proper rack-and-pinion gears G to a position which brings the front plate of the lock under the milling-tool, which is attached to the spindle C. The operator can now produce a clouded or mottled surface, as well as almost any ornamental figure or design which his fancy may suggest, upon the plate, by moving the table relatively to the revolving mill, or by moving the mill relatively to the table, or by moving both the table and the milling-tool contemporaneously.

When I desire to produce an effect very similar to that called stone finish, which is effected by grinding a smooth face of metal with a small whetstone, held in the hands and moved in curved lines, I move both the cranks, and cause the tool to travel in zigzag or curved lines over the surface. If the feed or relative motion of surface and tool be slow, the effect will be cloudy or wave-like. If it be fast, there will be perceptible lines and scores, producing lights, shades, and shadows on the surface.

If I desire to produce an effect similar to the band d in Fig. 2, or the strongly-lined part in Fig. 3, I move the surface relatively to the tool very rapidly, so that the tool traverses the surface in straight lines, and thus produces cycloidal curves of surface or scores, and pretty deep shadows. In producing this effect the tool may project over the edge of the surface, so that its teeth cut during only a portion of a revolution. I think this latter effect is produced owing to the fact that the teeth on one side of the axis of the tool which revolve against the progression of the surface cut rapidly and deeply, while the teeth on the other side of the axis, cutting on a surface which is moving rapidly in the same direction as the teeth, hardly cut at all. Some of the effect, moreover, when rapid feeding is applied, may be due to the springing of the tool-shaft, so that it chatters or cuts most with its face, which is in advance when the tool is moving relatively to the surface, and, as it were, digs into the surface; but whether I be right or wrong in my theory is of no importance, as the manipulation described with a milling-tool revolving at the usual velocity will produce ornamental effects.

I have used the words "slow," "fast," and "rapid" as applied to the feed. I cannot give any precise number of inches per minute as corresponding to those words. All I can say is, that if any one will take a piece of brass with a smooth surface, and put it in a milling-machine, and run it under the tool at a greater speed than that which will produce smooth cutting, he will be informed by the effect as to what I mean by "fast," and if he increase this speed till the tool scores the surface, he will know what a "rapid" feed means. The cloudy or wavy effects, which result from a zigzag or curvilinear feed, may be produced by an emery-wheel, grindstone, or whetstone, mounted and acting as a face-milling tool acts, and I consider them as equivalents for milling-tools.

What I claim as my invention, and desire to secure by Letters Patent, is—

The described improvement in the art of ornamentally surfacing metallic articles, which consists in subjecting the article to be so surfaced to the action of one or more revolving milling-tools while supported upon a bed or table having a movement within a fixed plane relative to such tool, and advancing and withdrawing the work under the conditions hereinbefore explained, thereby producing by abrasion the ornamental effects, substantially as shown and described.

FRANK W. MIX.

Witnesses:
M. S. WIARD,
THEO. E. SMITH.